United States Patent [19]

Kohler et al.

[11] 3,708,739
[45] Jan. 2, 1973

[54] REGULATED ELECTRICAL INVERTER SYSTEM

[75] Inventors: Thomas P. Kohler, Baldwinsville; Marvin W. Smith; Charles W. Van Marter, both of Syracuse, all of N.Y.

[73] Assignee: General Electric Company, Syracuse, N.Y.

[22] Filed: Nov. 24, 1971

[21] Appl. No.: 201,757

[52] U.S. Cl. ..........................321/21, 321/2, 321/18, 321/27 MS
[51] Int. Cl. .............................................H02m 7/48
[58] Field of Search .................321/2, 18, 21, 27 MS

[56] References Cited

UNITED STATES PATENTS

| | | | |
|---|---|---|---|
| 3,031,629 | 4/1962 | Kadri | 321/27 MS |
| 3,205,424 | 9/1965 | Bates | 321/18 |
| 3,237,081 | 2/1966 | Martin | 321/18 |
| 3,381,205 | 4/1968 | Howell et al. | 321/18 |
| 3,403,318 | 9/1968 | Krauthamer et al. | 321/21 X |
| 3,452,266 | 6/1969 | Borden et al. | 321/18 |
| 3,601,682 | 8/1971 | Iwata et al. | 321/21 |
| 3,603,866 | 9/1971 | Opal | 321/27 MS |

Primary Examiner—William M. Shoop, Jr.
Attorney—Carl W. Baker et al.

[57] ABSTRACT

A regulated electrical inverter system particularly adapted for power supply to pulsed loads and other sharply varying loads requiring close regulation of input voltage. The system comprises dual constant frequency inverters having their outputs summed and their relative phases oppositely adjusted so as to hold the summed output to the load at the regulated value. These phase controlled inverters receive their power input through a D-C transformation circuit including a pair of D-C choppers operating under fixed timed ratio control at the same frequency as the inverters, and the inverters have their outputs connected through a diode bridge back to the input of the D-C transformation circuit for purposes of clamping the inverter output voltage and maintaining inverter loading when the actual load becomes reactive. Automatic regulation of inverter power output is provided by a closed loop control system which maintains the output within close limits and enables vary fast response to load switching, while also providing a time averaging capability which compensates for long term load variations.

10 Claims, 3 Drawing Figures

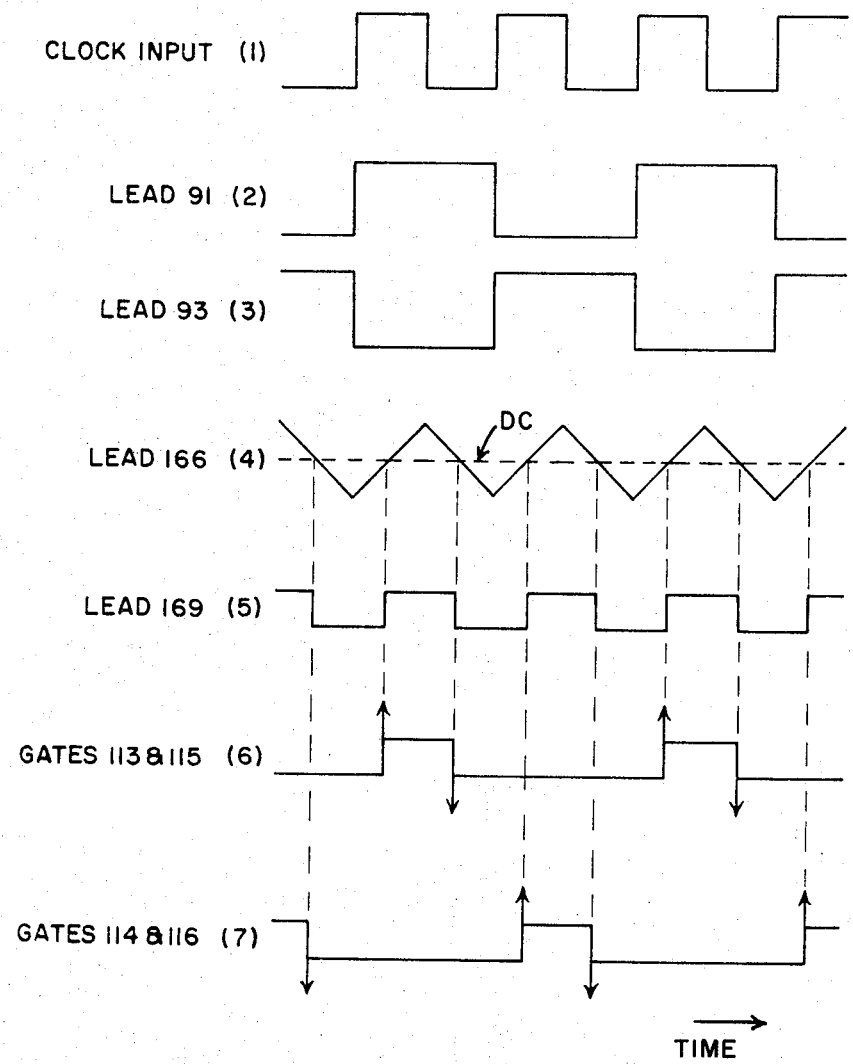

REGULATED ELECTRICAL INVERTER SYSTEM

BACKGROUND OF THE INVENTION

The invention herein described was made in the course of or under a contract with the Department of the Navy.

This invention relates generally to electrical inverter systems and more particularly to such systems which comprise dual inverters oppositely phase shifted for output power control.

The prior art includes a variety of inverter systems in which paired inverters have their outputs summed and the sum power level is controlled by oppositely shifting the respective phases of the paired inverters. The operation is such that when the inverters are squarely in phase with each other their respective outputs effectively cancel each other and the summed output to the load is zero; as they are shifted away from the in-phase condition the output increases and reaches a maximum at the 180° out of phase point. Inverter systems of this kind afford important advantages in terms of electrical efficiency and in terms of the speed and accuracy of control which is possible by phase shift regulation in this manner.

The inverter of the present invention is of the general class just described, and offers significant improvements over known systems in such respects as complexity and cost of system implementation, in electrical efficiency particularly with pulsed or otherwise widely varying loads, and in precision of regulation of power output to the load with minimum deviation from the specified voltage and power levels during either steady state or pulsed operation. The inverter system of this invention lends itself to solid state implementation and offers substantially reduced requirement for iron core components such as transformers, thus affording substantial reduction in system weight and size.

SUMMARY OF THE INVENTION

The phase shift regulated inverter of the present invention comprises a pair of phase controlled inverters having their outputs summed so that power to the load may be regulated by oppositely shifting the phases of the two inverters. These inverters connect to their D-C supply through a D-C voltage transformation circuit which provides a step-down of the D-C supply voltage as applied to the inverters, such voltage transformation preferably being provided by a time ratio controlled (TRC) chopper operating at fixed frequency and fixed time ratio. To accommodate wide and abrupt variations in loading of the output of the phase controlled inverters with pulsed and highly reactive loads, a rectifier bridge connected directly across the load provides feedback directly to the D-C supply input to the voltage transformation circuit, thus stabilizing inverter operation and providing positive clamping of inverter output voltage without need for the usual output feedback transformers.

For inverter phase control, a regulation circuit provides precise control of output power to the load even when pulsed or highly reactive, and also incorporates a number of protective features which become operative automatically to avoid damage to the system in the event of short circuiting of the load or fire-through of one of the inverter circuits. More particularly, the regulation circuit generates the necessary gating signals for both the phase controlled inverters and the TRC choppers, and it provides a form of circuit breaker action by inhibiting these gating signals in the event of overcurrent due to a load short or inverter malfunction. To these ends the regulator accepts as inputs the inverter load and supply voltages, and a load condition signal which in the case of a D-C load preferably is derived as a measure of the rectifier filter capacitor current. This signal serves both to provide anticipation of increased power requirement to the load and also to provide a fast indication of any load short requiring shutdown of inverter operation.

BRIEF DESCRIPTION OF THE DRAWINGS

The foregoing and other objects, features and advantages of the invention will be more fully understood by reference to the appended claims and to the following detailed description when read in conjunction with the accompanying drawings, wherein:

FIG. 3 is a timing diagram illustrating waveforms in the circuit of FIG. 2.

DESCRIPTION OF THE PREFERRED EMBODIMENT

Figure 1:
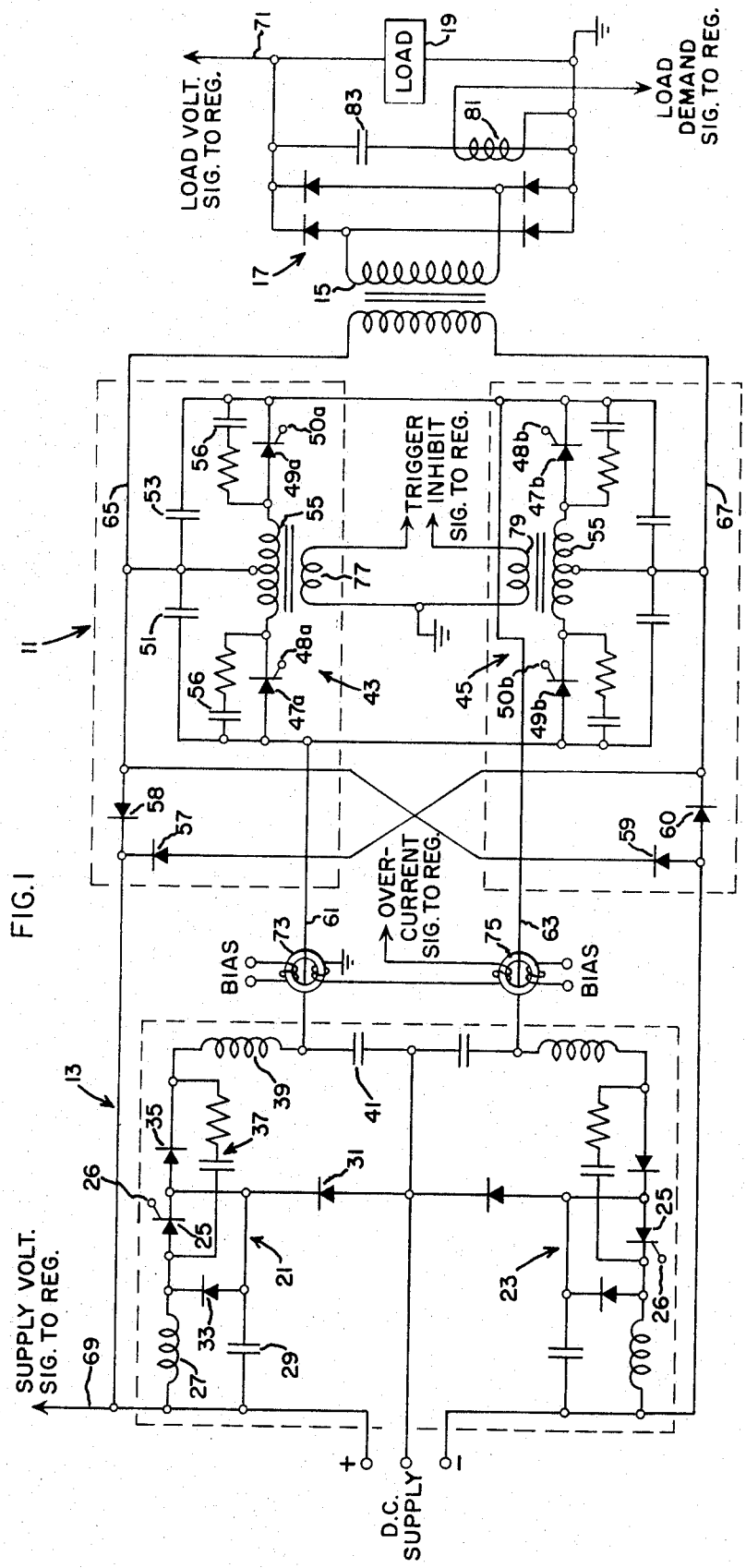
FIG. 1 is a schematic circuit diagram of a dual phase controlled inverter in accordance with the invention, including a D-C transformation circuit through which it receives its power supply.

As illustrated in FIG. 1, the phase shift regulated inverter of this invention comprises a dual or paired inverter circuit designated generally by reference numeral 11 which receives its power input through a D-C voltage transformation circuit designated generally by reference numeral 13, and applies its A-C power output through a high reactance transformer 15 and full wave rectification circuit designated generally by reference numeral 17 to the load 19. While this load 19 may be any of many kinds requiring D-C voltage supply (or A-C supply with omission of the rectification circuitry 15), the performance capabilities of the inverters of this invention offer particular advantage with loads such as traveling wave tubes and other high voltage pulsed devices.

The D-C voltage transformation circuit 13 serves a number of purposes including the provision of the different D-C voltages necessary for inverter supply, output voltage limiting and current feedback without need for transformers in the feedback circuit, and it provides also a circuit breaker function accomplished electronically and with only solid state components. As shown the voltage transformation circuit is a two-channel one comprising a pair of TRC choppers 21 and 23, one for each of the D-C positive and negative power supply inputs. These choppers operate under common control with the inverters, and preferably are arranged to operate at constant frequency and with fixed voltage transformation ratio which may be achieved either by pulse width modulation, or as in the illustrated embodiment, by time ratio control. The choppers may employ generally conventional circuitry as shown, each including a switchable control rectifier or thyristor 25 having a gate or control electrode 26 to which gate signals are applied for switching the thyristor on, and a timing circuit comprising an inductor 27 and capacitor 29 which commutate the thyristor off after lapse of the "on" time determined by the LC time constant. A freewheeling diode 31 is provided through which the load inductance may discharge when thyristor 25 is not conducting, and a pair of diodes 31 and 33 connected as shown control the charge on capacitor 29 when switch 21 is nonconducting. Preferably an RC circuit connected across the thyristor as at 37 is provided for suppressing switching transients.

The pulsed D-C passed by each chopper is smoothed by an LC circuit comprising an inductor 39 and capacitor 41, between which the output to the load is taken. With the arrangement shown, the thyristor circuits are self-commutating and have a fixed "on" time determined by the time constant of the LC elements 27–29, with their "off" time being determined by the repetition rate of the gating pulses applied to the thyristor control electrodes 26. Since as previously noted the gate pulse frequency preferably is held constant, each chopper will output to its load a D-C voltage which is a fixed fraction of the input D-C voltage. In the representative embodiment being described, this fraction was selected to be 0.636, to provide to the phase control inverters voltages of ± 90 each from voltage inputs to itself of ± 140 volts, respectively.

The phase controlled inverter system 11 comprises a pair of identical series inverters 43 and 45, generally conventional in themselves, which are self-commutating at the design operating frequency. As shown inverter 43 comprises a pair of thyristors 47a and 49a having gate electrodes 48a and 50a respectively, commutating capacitors 51 and 53, and center-tapped choke 55 in conventional series inverter circuit configuration. RC "snubbers" or transient suppression circuits 56 may be connected across the thyristors as illustrated. The same elements, designated in some cases with the subscript "b", comprise the other inverter 45.

As previously explained, known phase controlled inverter circuits have displayed performance shortcomings particularly at load extremes, i.e., under open circuit or short circuit conditions, and with rapid switching between load and no-load states. The inverter of the present invention incorporates several features for alleviating these difficulties, one such feature being provided by reactive feedback from the inverter outputs directly to the D-C voltage supply to the D-C voltage transformation circuit, without need for the additional transformers or other iron core components commonly required in known inverter systems employing reactive feedback.

The feedback network comprises a diode bridge constituted by diodes 57–60 connected as shown between the inverter output leads 65 and 67 and the positive and negative terminals of the power supply input to voltage transformation circuit 13. The voltage transformation ratio provided by circuit 13 is adjusted, by selection of LC time constant as previously explained, to maintain between the inverter input on leads 61 and 63 and the inverter output on leads 65 and 67 a voltage difference which is conducive to stable inverter operation under all loading including both short and open circuit conditions. In the particular embodiment being described the voltage transformation ratio provided by circuit 13 is approximately 0.636, so that with a voltage input to itself of ± 140 volts it drops this ± 90 volts as applied to the dual inverter 11.

The direct connection of the inverter output leads 65 and 67 through the diode bridge 57–60 then clamps the output voltage at the ± 140 volt levels which are provided at the input to the D-C voltage transformation circuit 13, thus holding the inverter output voltage within bounds during either shorted or open circuit load conditions. This same connection also provides a feedback path through which power is returned to the D-C supply during open circuit or reactive load conditions so as to maintain stability of inverter operation under all load conditions. Thus the inverters may both be operated at full power continuously, with division between the power output to the load and that fed back to the input being controlled by the inverter phasing signals.

Before turning to the regulation and control circuitry of FIG. 2, the several sensors shown in FIG. 1 which provide inputs to that circuitry will be described. Among these inputs are the D-C supply voltage input on lead 69, and the load voltage output on lead 71. The output current level from the voltage transformation circuit 13 to the dual inverter 11 on each of leads 61 and 63 also is sensed, this being accomplished by a backward biased current transformer 73 or 75 comprising a magnetic core having bias and output windings; an output pulse will appear on the latter winding whenever the core changes magnetic state with increase of current in lead 61 and 63 above a predetermined control value determined by the value of bias current. A pair of small control windings 77 and 79 each wound on the same core with one of the inverter chokes 55 provides a measure of choke current which is used as a trigger inhibit signal as hereinafter explained. Finally, a load demand signal generated by a current transformer 81 in series with the load filter capacitor 83, which filters the output of the rectifier network 17 as applied to load 19, provides a measure of load current demand as manifested by filter capacitor discharge current flow.

Figure 2:
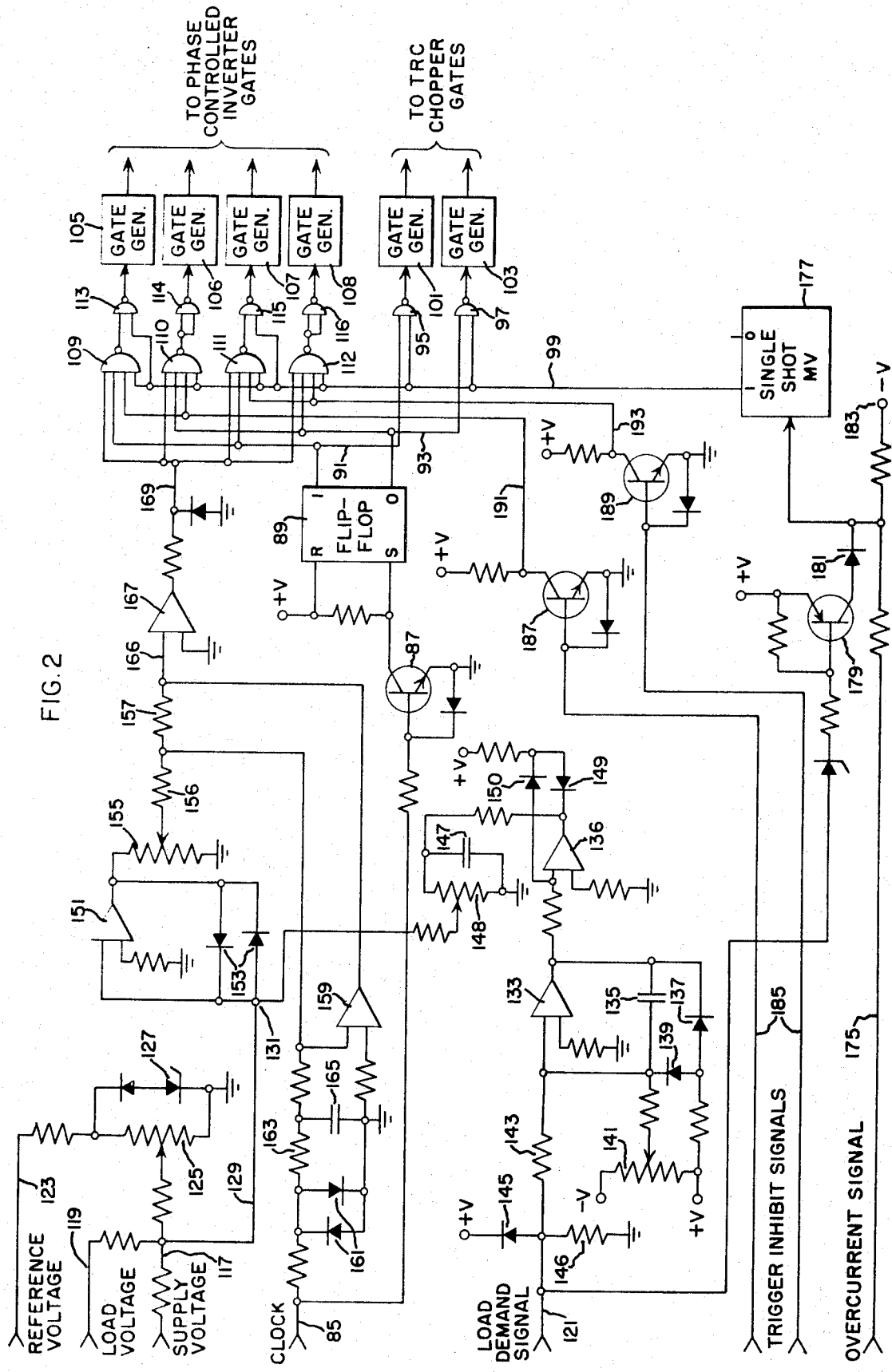
FIG. 2 is a schematic circuit diagram of the regulation and control circuit for the inverter of FIG. 1.

The regulation circuit of FIG. 2 controls the frequency of operation of both the voltage transformation circuit and the dual inverter in response to a clock input on lead 85. For control of the TRC chopper circuits 21 and 23, the clock pulses after amplification at 87 are applied to a toggle circuit in the form of a flip-flop 89, which is connected as shown to alternate the outputs on its "0" and "1" terminals with each clock pulse input to its SET terminal. The flip-flop output on leads 91 and 93 is applied to a pair of NAND elements 95 and 97 which, in the absence of any inhibit applied to their other input on lead 99 as hereinafter explained, will apply output gating signals to the associated gate generator 101 or 103 at half the clock frequency. Responsive to these signals, the gate generators alternately supply output to the control electrodes 26 of the TRC chopper thyristors the trigger signals which effect the chopper operation.

Flip-flop 89 via its output leads 91 and 93 also supplies trigger signals to the phase controlled inverter gates, the four gate generators for which are shown at 105–108. This is accomplished through a like number of four-input NAND gates 109–112 each followed by a two-input NAND gate as at 113–116. Two of the latter NAND gates (114 and 116) serve simply as inverters providing a polarity reversal of the gate generator signals; the other two operate as hereinafter explained.

To provide phase control of the inverters, each of the NAND gates 109–112 is provided with a phase control signal derived from the three control inputs from the circuit of FIG. 1, viz., the supply voltage signal on lead 117, the load voltage signal on lead 119 and the load demand signal on lead 121. The supply and load voltages are combined through a divider network to which a reference voltage is applied via lead 123 to a variable resistor 125 across which a zener diode 127 holds a fixed voltage drop. Where the supply and load voltage signals are taken from the positive side of the circuit as in the exemplary embodiment being described, this reference voltage will be negative in polarity, and that part of it which is referenced against the supply and load voltage inputs via the divider connection to the variable resistor 125 will determine the values of supply and load voltages at which the divider outputs a control signal on lead 129 to a summing point or terminal 131.

The other input to this terminal 131 derives from the load demand signal on lead 121. That signal is integrated by an operational amplifier at 133, which as shown may be a conventional operational amplifier enclosed by a feedback loop including an integrating capacitor 135 and diodes 137 and 139. A potentiometer 141 connected between positive and negative reference voltage sources provides a variable D-C level for the control signal input to amplifier 133 and enables adjustment of the output pulse length for a given current-time integration curve. To enable the setting of input D-C level to the amplifier 133 in this way, a resistor 143 provides isolation between the amplifier input and another D-C level set circuit comprising diode 145 and resistor 146, which control the D-C voltage level for the load demand signal as elsewhere applied in the control circuitry, as will be explained.

The integrated signal output of operational amplifier 133 is applied to a buffer amplifier 136 which conveniently may take the form of another operational amplifier, the output from which is applied across a capacitor 147 and potentiometer 148, and thence to the summing terminal 131. The D-C voltage level on the output of amplifier 136 may be set by connection to a reference voltage source through a diode 149, and a second connection to this source through another diode 150 clamps the amplifier input.

In operation of the integration circuit just described, the current waveform from the filter capacitor to the load is sensed to input a load demand signal on lead 121 and thereby to the integrating amplifier 133, which outputs pulses of width determined by the net flow of charge from the filter capacitor. These pulses are integrated by capacitor 147 and the anticipation signal thus generated is applied to summing terminal 131. Its initial effect there is to drive the inverters toward their out-of-phase or full power output condition; then after the integrals of current flow from the filter capacitor decrease to a magnitude such as would indicate that the capacitor is becoming again fully charged or nearly so, the anticipation signal acts to drive the inverters toward their in-phase or reduced output condition with little if any overshoot. In this way the initial output current from the inverters may be permitted to be quite high, without overshoot of the load voltage as otherwise might occur when a pulsed load is switched.

The control signal thus derived and transmitted to summing terminal 131 is applied to an amplifier which as shown may conveniently take the form of an operational amplifier 151 having voltage feedback through oppositely poled diodes 153, and having its output applied across a potentiometer 155 as shown. The control voltage tapped from potentiometer 155 is combined via a summing resistor 157 with a ramp voltage which is generated by an operational amplifier 159 in response to the clock input on lead 85. The clock input signal is clamped by oppositely poled diodes 161 connected to ground, and is passed through an RC low pass filter comprising resistor 163 and capacitor 165 which effectively integrates the pulses and thus causes the amplifier to output a linearly ramped voltage repeating cyclically with the clock input. A portion of the amplifier output voltage is fed back to its input through resistor 157 for waveform linearization.

The summed control and ramp voltages appearing at the righthand end of resistor 157 are applied via lead 166 to one input of a dual-sided operational amplifier 167 connected for operation as a voltage comparator with its other input connected to ground as shown. The ramp voltage output from amplifier 159, which as previously explained is a triangular waveform the D-C level of which is determined by the control signal input from amplifier 151, will toggle the operational amplifier 167 alternately off and on, with the duration of its respective off and on times being determined by the D-C level of the triangular voltage waveform above ground. Thus by proper adjustment of control signal and ramp voltage levels their input to the comparator can be centered on zero volts when the inverter output parameters all are at their design values, and the comparator 167 then will cycle on and off with each clock pulse, with equal on and off periods. If the inverter output or load voltage were low, however, the control amplifier 151 then would output a more positive voltage across potentiometer 155, and the triangular waveform output from amplifier 159 would shift above the zero volt line, causing the on time of comparator 167 to be reduced and its off time to be increased correspondingly. The comparator thus will toggle once each clock pulse input, but with its on and off times varying oppositely with changes in the control voltage from amplifier 151. The output from comparator amplifier 167 is applied to the NAND gates 109–112 and through them to the associated gate generators.

NAND gates 109–112 also have inputted to them inhibit signals which prevent generation of trigger signals to the inverter gates under certain operating conditions. More particularly, an overcurrent signal on lead 175, which signal derives as shown in FIG. 1 from current sensors on the output from the voltage transformation circuit to the dual inverters, will trigger a multivibrator 177 to flip from its stable state, in which it outputs a "1" on lead 99, to its alternate state in which it outputs on "0" on that lead to the NAND gates for the TRC chopper gate generators, disabling them against output of any trigger signal to thus shut down the choppers. The switch from "1" to "0" on lead 99 also is communicated to the NAND gates 109–112, 113 and 115 for the phase controlled inverter gate generators, to inhibit inverter operation as will be more fully explained.

Multivibrator 177 may also be triggered by the load demand signal on lead 121, which derives from the load filter capacitor current sensor and is coupled to the multivibrator input through a transistor amplifier 179 and diode 181. The level of the load demand signal which is effective to trigger the multivibrator 177 may be set by adjustment of the bias voltage level at reference voltage input 183 and adjustment of values of the biasing resistors for transistor amplifier 179, so as to trigger the multivibrator 177 only in event the load demand signal rises to a level which is indicative of an actual short in the load.

The other inhibit signals to NAND gates 109–112 derive from the trigger inhibit signals on leads 185 which it will be recalled are generated by the control windings on the inverter chokes in FIG. 1. These signals are applied to either of two transistor amplifiers 187 and 189 each of which has its output connected to inputs of two of the NAND gates 109–112. The trigger inhibit signals thus inputted are responsive to the firing of one inverter thyristor to disable the opposing thyristor of that inverter, to assure that the latter thyristor does not also fire during the critical swinging period, causing a "fire through". The circuit also reduces the control current requirement, by cutting short the gating pulse input to the trigger gate generator.

The manner in which this inhibit function is accomplished, as well as the operation of the other control inputs to the phase controlled inverter gate generators, will be best understood by reference to the signal sequence diagram of FIG. 3 to which reference now is made. The generation and toggling of the trigger signals on leads 91 and 93 (Waveforms 2 and 3) is effected by flip-flop 89 at half the frequency of the clock input (Waveform 1), and the sawtooth voltage waveform on lead 166 (Waveform 4) derives from the clock input and has its D-C level set in accordance with the load and supply voltage signals as previously explained. The operational amplifier 167 will output phase control signals on leads 169 (Waveform 5) which are applied as one of the inputs to the NAND gates 109–112. The combination of these inputs with those on leads 191 and 193 deriving from the trigger inhibit signals, and with the inputs on leads 91 and 93 from flip-flop 89, will combine to produce outputs from the NAND gates 113 and 115 as shown by Waveform 6 in FIG. 3. The outputs from gates 114 and 116 will be as shown by Waveform 7. The first inverter (43) will trigger on the leading edges of Waveforms 6 and 7 as indicated by the upwardly directed arrows, and the other inverter (45) will trigger on the trailing edges of these waveforms as indicated by the downwardly directed arrows.

In the event the signal on lead 99 changes polarity to a "0" indicating a fault, all the NAND gates 109–112 will output "1"s. NAND gates 114 and 116 accordingly will output 0's, disabling their respective gate generators 106 and 108. NAND gates 113 and 115 will now have "0"s on both inputs and so will output "1"s which will latch the associated thyristors on and disable the inverters. NAND gates 95 and 97 and the TRC chopper gate generators 101 and 103 also will be disabled, to provide the circuit breaker function mentioned previously.

Many modifications in the phase controlled inverter circuit of this invention as hereinbefore disclosed are possible. For example, the thyristors shown in the voltage transformation circuit and dual inverter circuits could be replaced with power transistors or other solid state switching devices if preferred, and the logic elements by which inverter control is accomplished may take any of many alternative forms. These and other modifications will be obvious to those skilled in the art and accordingly it should be understood that the appended claims are intended to cover all such modifications as fall within the true spirit and scope of the invention.

What is claimed as new and desired to be secured by Letters Patent of the United States is:

1. A regulated electrical inverter system comprising:
   a. a D-C power supply providing both positive and negative D-C voltage supply;
   b. a D-C voltage transformation circuit energized by said D-C power supply and including positive and negative voltage transformation means having like voltage transformation ratios substantially less than one whereby their D-C voltage outputs are proportioned to but substantially lower than their D-C voltage inputs from said supply;
   c. a dual inverter circuit comprising a pair of inverters having positive and negative input polarities from said D-C voltage transformation circuit and including means for summing their respective outputs in a manner such that when their relative phases are oppositely shifted the summed output adjusts in a direction and to an extent determined by the phase shift;
   d. a load having applied thereto the summed output of said inverters;
   e. a rectifier bridge connected to provide feedback paths from the output of each of said inverters to the positive and negative voltage inputs to said D-C voltage transformation circuit whereby power is fed back through said rectifier bridge whenever the output voltage of either inverter exceeds the D-C supply input voltage of corresponding polarity; and
   f. control means responsive to a load power condition for oppositely shifting the relative phases of said inverters for controlling their summed output to said load.

2. An inverter system as defined in claim 1 wherein said D-C voltage transformation circuit comprises a pair of time ratio controlled D-C choppers and means for operating said choppers at constant time ratio and frequency.

3. An inverter system as defined in claim 2 wherein said D-C choppers and said dual inverters each comprise gated solid state switching devices, and further including means for generating constant frequency trigger signals for gating the switching devices both of said D-C choppers and of said dual inverters.

4. An inverter as defined in claim 3 further including means responsive to a load power condition departure from normal for disabling said trigger signal generating means.

5. An inverter as defined in claim 3 wherein said means for generating constant frequency trigger signals for gating the switching devices of said dual inverters comprise means for time shifting the gating signals to the switching devices of one inverter with respect to those to the other, to thereby oppositely shift the relative phases of the inverters for adjusting their summed output.

6. An inverter as defined in claim 1 further including rectifier means connected between the inverter output and the load for D-C supply thereto, filter capacitor means for smoothing D-C flow from said rectifier means to said load, and current sensor means responsive to filter capacitor current flow for providing a load demand signal constituting the load power condition input to said control means.

7. An inverter as defined in claim 6 wherein said control means further includes means for integrating said load demand signal to derive an anticipation signal, and means responsive to said anticipation signal to adjust the relative phase of the outputs of said dual inverters to thereby control their summed output.

8. An inverter as defined in claim 7 wherein said control means further includes means directly responsive to said load demand signal to disable said dual inverters in the event said load demand signal exceeds a predetermined level indicative of a load short.

9. A regulated electrical inverter system comprising:
 a. D-C power supply means providing both positive and negative polarity supply;
 b. D-C voltage transformation means including positive and negative polarity voltage transformation circuits each accepting input of a D-C voltage of appropriate polarity from said power supply means and providing a D-C output of like polarity but of substantially lower voltage level;
 c. dual inverter circuits having a common D-C power supply input through said voltage transformation means and each comprising gated solid state switching devices operable when periodically gated to convert D-C voltage input thereto to a cyclically varying output, said inverters further comprising means for summing their respective outputs to produce a summed output of magnitude dependent on the phase relationship therebetween;
 d. a load having applied thereto the summed output of said inverters;
 e. a rectifier bridge connected to provide feedback paths from the output of each of said inverters to the positive and negative voltage inputs to said D-C voltage transformation circuit whereby power is fed back through said rectifier bridge whenever the output voltage of either inverter exceeds the D-C supply input of corresponding polarity;
 f. gating signal means for said inverter switching devices including clock means, means responsive thereto to output trigger signals at substantially constant frequency, and gate generator means responsive to said trigger signals to apply gating signals to said inverter switching devices; and
 g. control means responsive to a load power condition for time shifting said gating signals as applied to the switching devices of one inverter with respect to those to the other, for controlling the division of inverter output power as between said load and said feedback to the D-C supply to thus provide load power regulation.

10. An inverter system as defined in claim 9 wherein said D-C voltage transformation circuits comprise time ratio controlled D-C choppers including gated solid state switching devices, and wherein said trigger signals also are applied to said choppers for operation thereof with fixed time ratio and at the same frequency as said inverters.

* * * * *